July 30, 1968 M. H. PETERSSEN ET AL 3,395,322
CONTROL APPARATUS FOR SERVO DEVICE
Filed Dec. 10, 1964 2 Sheets-Sheet 1
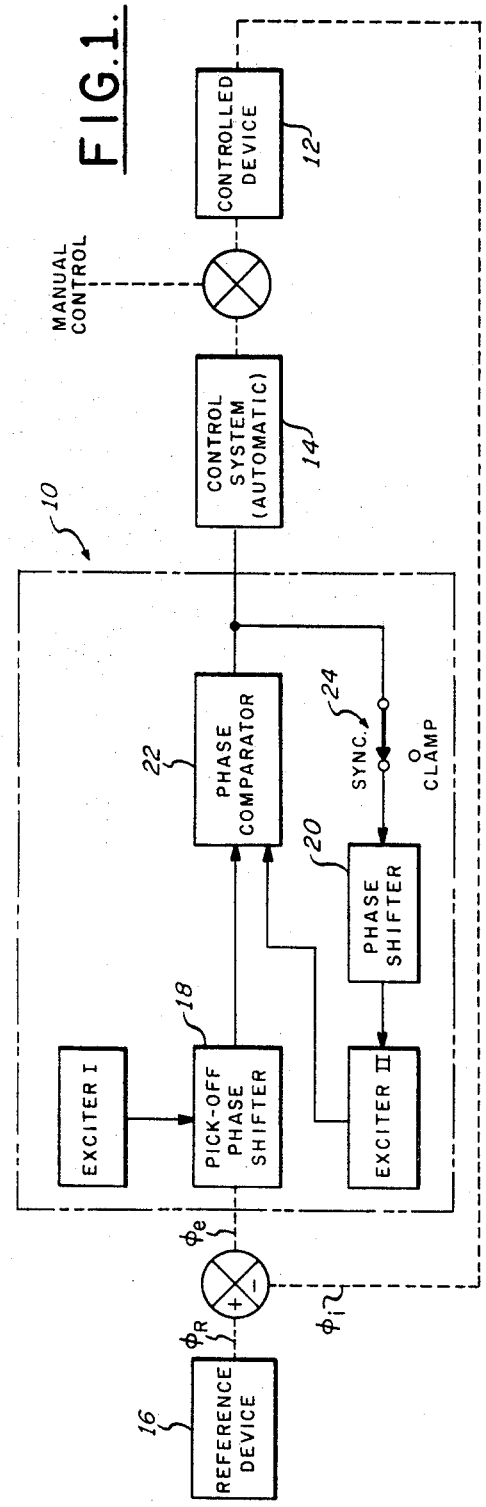
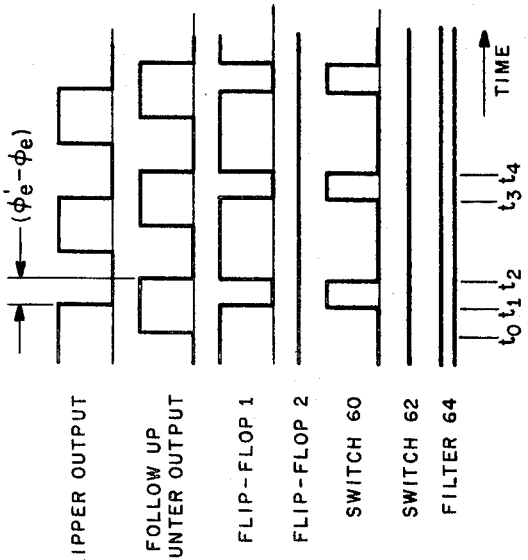
INVENTORS
MARTIN H. PETERSSEN
EVERETT R. TRIBKEN
BY
S.C. Yeaton
ATTORNEY

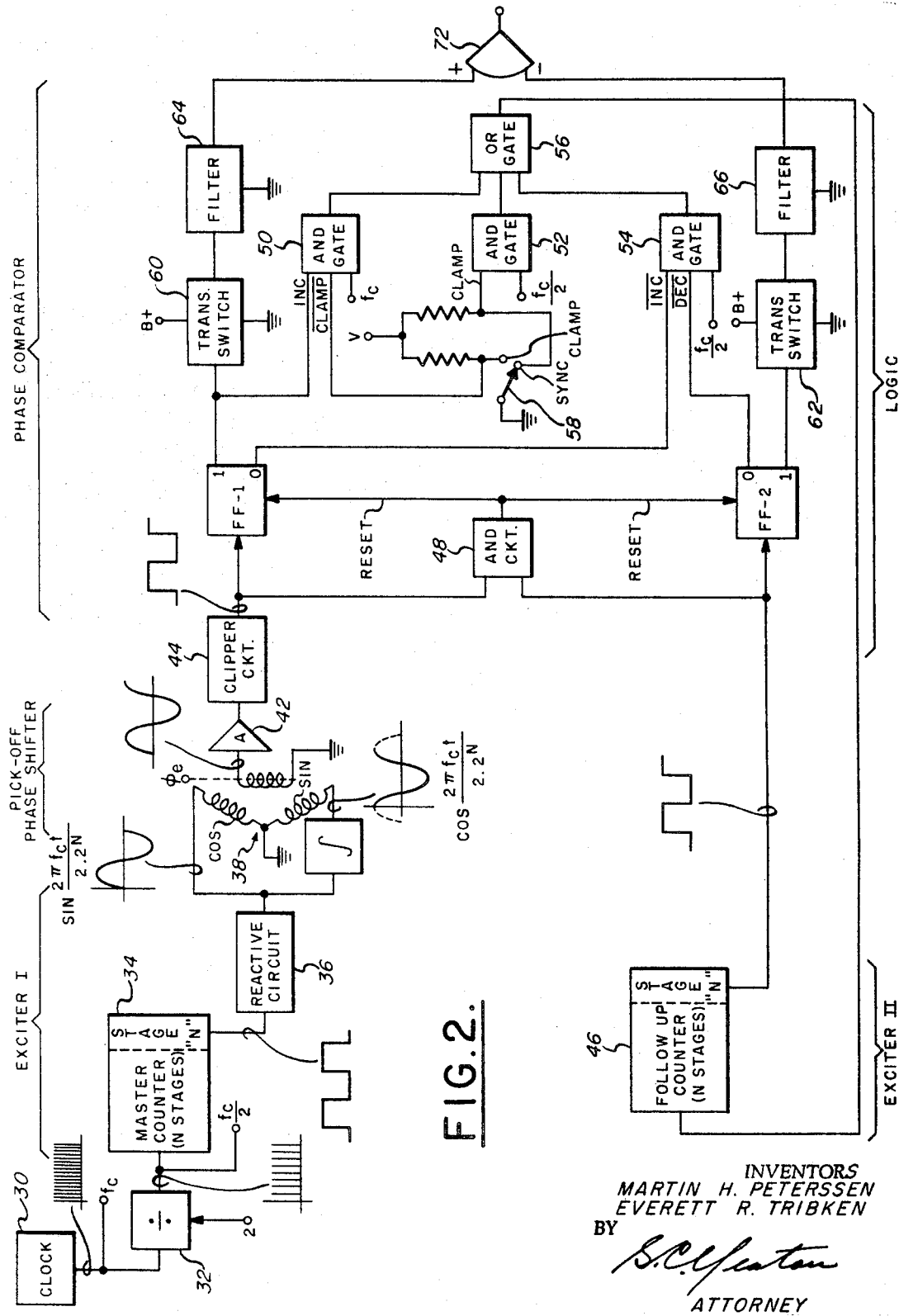

United States Patent Office 3,395,322
Patented July 30, 1968

3,395,322
CONTROL APPARATUS FOR SERVO DEVICE
Martin H. Peterssen, Phoenix, and Everett R. Tribken, Scottsdale, Ariz., assignors to Sperry Rand Corporation, Great Neck, N.Y., a corporation of Delaware
Filed Dec. 10, 1964, Ser. No. 417,388
14 Claims. (Cl. 318—18)

This invention relates in general to control apparatus, and in particular it relates to apparatus for selectively applying a control signal to a condition-controlling servo device, whereby that device controls the condition so as to keep it invariant with respect to the condition had at the instant the signal was first applied to the servo device.

More specifically, the invention will permit, for example, an aircraft autopilot to be kept continuously synchronized to an attitude reference device such as a gyroscope, whereby no signal will be applied to the autopilot so long as the autopilot is in a synchronzied mode of operation, and even though the gyroscope provides an output attitude error signal representing craft attitude with respect to the gyro reference attitude. Then, by means of the invention, when the autopilot is switched to an attitude-hold mode of operation, the autopilot will thereafter receive a control signal to prevent craft attitudes, not with respect to the gyro reference attitude, but with respect to the craft attitude had at the instant the attitude-hold mode was engaged. In other words, with the present invention, a pilot may manually fly his craft to effect, for example, a nose-up attitude, and then engage his auto-pilot (attitude-hold mode) to fly his craft to keep that nose-up attitude. Such feature is made possible by continuously providing an attitude signal which follows-up to cancel the gyro output attitude error signal while the autopilot is in its synchronized mode, and then at the instant the autopilot is switched to its attitude-hold mode of operation, fixing the magnitude of the follow-up attitude signal and thereafter applying to the autopilot a signal representing the difference between the instantaneous gyro attitude error signal and the "fixed" follow-up attitude signal. Present practice to accomplish the above generally is to employ electromechanical components, viz. gyro pick-off to a control transformer to a servo that drives the rotor of the control transformer during synchronization, and clamping the servo motor during attitude-hold. But these techniques are deficient for the reason that they employ moving parts, being subject to relatively frequent breakdowns and requiring considerable maintenance. The apparatus of the present invention, on the other hand, employs no moving parts (except the gyro pick-off for its synchronization and attitude-hold modes), being based conceptually on the fact that if a first free running source of A.C. signals has the phase of such signals varied as a function of an attitude error signal, and a second free running source of A.C. signals of the same frequency has its signals used in a phase detector as a phase reference for the signals of the first source, then the output signal from the phase detector may be applied to a control system to hold any given instantaneous attitude, provided however that the phase detector first adjusts in proportion to its own output signal the phase of the signals from the second source of A.C. signals.

A principal object of the invention is to provide improved control apparatus.

Another object of the invention is to provide apparatus for applying a control signal to a servo system, which signal represents a displacement between an instantaneous attitude and an attitude (taken with respect to a reference attitude) had at a particular time.

Another object of the invention is to provide improved apparatus for synchronizing an autopilot to an attitude reference device.

Another object of the invention is to provide apparatus for synchronizing an autopilot to an attitude reference device without need for components having moving parts.

Another object of the invention is to provide apparatus for synchronizing an autopilot to an attitude reference device, which apparatus employs digital computing techniques.

The invention will be described with reference to the figures wherein:

FIG. 1 is a block diagram showing generally the apparatus of the present invention;

FIG. 2 is a diagram showing a presently preferred embodiment of the invention; and FIG. 3 shows a set of waveform diagrams useful in describing the apparatus of FIG. 2.

Referring to FIG. 1, the apparatus of the invention (within dashed lines 10) is shown broadly in a complete closed loop system in an effort not only to show how such apparatus itself works, but also to show how it affects operation of the system. To be borne in mind is that whereas the component blocks of FIGURE 1 are presented to show functionally how the concept of the present invention may be embodied, preferred forms of such component blocks will be described later in connection with the description relating to the embodiment of FIG. 2. A device 12 which may represent for example an aircraft may be controlled either manually or automatically by means of a control system 14, such system 14 being responsive to received control signals to alter the attitude of the controlled device 12. A reference device 16 which may for example be a gyroscope compares the attitude $\phi_i$ of the device 12 (aircraft attitude) with its own reference attitude $\phi_R$ to produce an attitude error signal $\phi_e$ at a pick-off 18. The pick-off 18, which is excited by an A.C. exciter source I has its excitation signal phase shifted in accordance with the attitude error signal $\phi_e$. A second A.C. exciter source II, producing a signal having the same frequency as the signal from the source I, applies its signal to a phase comparator 22 which compares this signal to that of the pick-off phase shifter and whose output signal is applied through a switch 24 to the phase shifter 20 which in turn adjusts the phase of the exciter II signal until the phase of the two inputs to the phase comparator are equal. Aside from being applied to the phase shifter 20, when the switch 24 is in the position shown, the output of the comparator 22 is applied also to the atuomatic control system 14.

To understand the operation of the apparatus of FIG. 1, consider initially the exciter sources I and II as running at respective arbitrary phases and the controlled device 12 (i.e., the aircraft) with the same attitude as is defined by the reference device 16 (i.e., the gyroscope). With the switch 24 in the position shown (SYNC), the phase comparator 22 will produce a signal which not only will tend to make the phases of the two signals applied thereto the same, but will also initially apply a signal to the control system to cause the device 12 (the aircraft) to start to change attitude with respect to the attitude of the reference device 16 (the gyro), thereby creating a signal $\phi_e$ to change further the phase of the pick-off phase shifter signal with respect to the phase of the exciter II signal. Assuming the pilot wants, for the moment, to keep his craft at the reference attitude $\phi_R$ he will manually control his craft to cancel the signal $\phi_e$ and thereby cancel the aforementioned further change in the phase of the pick-off phase shifter signal. During synchronization typically the phase comparator error signal is prevented in the prior art from reaching the control system because the servos are not engaged or the signal path is blocked. In the actual present case synchronization is so fast that an aircraft control system can not respond to the control signals required for synchronization.

Now, with the phases of the two signals applied to the comparator 22 the same, assume the pilot wishes to change manually the attitude $\phi_1$ of his craft with respect to the reference attitude $\phi_R$. As he does this, a new attitude error command $\phi_1$ gets applied to the phase shifter pick-off 18 to shift the phase of the signal from the pick-off phase shifter with respect to the phase of the signal from the exciter II. Instantly the phase comparator 22 provides a signal output which on being applied to the phase shifter 20 operates in feedback fashion to keep not only the phase of the exciter II signal constantly following up on and the same as the phase of the pick-off phase shifter signal, which latter signal is changed in response to aircraft attitude changes. This follow-up action maintains the output of the phase comparator at zero. In other words, the control system is kept constantly synchronized to the present attitude of the craft (device 12).

Now, with the craft at some attitude $\phi_1$ with respect to the reference attitude $\phi_R$, assume that the pilot wishes to have his autopilot (control system 14) to fly his craft that the craft maintains his manually selected attitude $\phi_1$. To do this, he throws his switch 24 to the CLAMP (autopilot engage) position, whereby the phase of the exciter II signal becomes fixed; and since at this moment no signal appears at the phase comparator 22 output, the autopilot (control system 14) does not dry transiently to change the craft attitude $\phi_1$. Should, however, external disturbance such as gusts etc., now cause the craft attitude to change from $\phi_1$ to $\phi'_1$, the signal $\phi_e$ will correspondingly change to $\phi'_e$, whereby an error signal will appear at the phase comparator 22 output (since the exciter I signal phase is fixed) which will cause the autopilot (control system 14) to correct the craft attitude to the manually selected attitude $\phi_1$.

Referring now to FIG. 2, a presently preferred form of the circuit 10 of FIG. 1 has a source of clock pulses 30 which occur at a rate of $f_c$, and which are applied to a frequency divider element 32. As shown, the divider element 32 produces pulses at a frequency of $f_c/2$.

The output pulses ($f_c/2$) from the element 32 are applied to a binary master counter 34, the Nth stage of which provides a square wave output resulting from the switching of the Nth stage. Therefore, the cyclic frequency for the Nth stage is $$\frac{f_c}{2 \cdot 2^N}$$

since it takes $2^N$ pulses to cycle an N stage binary counter. It is this frequency which is the basis for the exciter I signal. The square wave output signal from the counter 34 is smoothed to form a sine wave signal $$\left(\sin \frac{2\pi f_c t}{2 \cdot 2^N}\right)$$

of the frequency $$\frac{f_c}{2 \cdot 2^N}$$

by a reactive circuit element 36, which element may, for example, be a series tuned circuit tuned to the frequency $$\frac{f_c}{2 \cdot 2^N}$$

A resolver 38, constituting the pick-off phase shifter 18 of FIG. 1, has its cosine winding excited by the sine signal $$\left(\sin \frac{2\pi f_c t}{2 \cdot 2^N}\right)$$

and its sine winding excited by a cosine signal $$\left(\cos \frac{2\pi f_c t}{2 \cdot 2^N}\right)$$

produced by integrating the signal $$\sin \frac{2\pi f_c t}{2 \cdot 2^N}$$

in an integrator 40. Therefore, the signal on the rotor of the resolver 18 is a sine wave signal $$\sin\left(\frac{2\pi f_c t}{2 \cdot 2^N} + \phi_e\right)$$

provided in accordance with the trigonometric identity, $$\sin\left(\frac{2\pi f_c t}{2 \cdot 2^N} + \phi_e\right) = \sin \frac{2\pi f_c t}{2 \cdot 2^N} \cos \phi + \cos \frac{2\pi f_c t}{2 \cdot 2^N} \sin \phi$$

where $\phi_e$ is a signal representing craft attitude with respect to the reference attitude of a gyroscope. (Though a resolver pick-off phase shifter is shown, it should be realized that other pick-off phase shifters also may be employed; for example, the pick-off could be a synchro, the stator windings of which are excited by respective sine wave signals which are phase shifted with respect to each other by 120 degrees.) The sine wave signal $$\left(\sin \frac{2\pi f_c t}{2 \cdot 2^N} + \phi_e\right)$$

is amplified by an amplifier 42, the output of which is applied to a limiter or clipper circuit 44 which provides a square wave output signal that is phase shifted with respect to the square wave signal provided by the Nth stage of the counter 34. A second binary follow-up counter 46 which may be exactly like the counter 34 also produces a square wave output signal resulting from the switching of its stage N, and it is the phase relationship between this square wave signal and the clipper output square wave that permits both synchronization and attitude-hold modes. That is, in the synchronize mode the follow-up counter 46 is pulsed in such a way (as will be described later) as to have its Nth stage produce a square wave output signal exactly in phase with the clipper 44 output square wave; during the attitude-hold mode, both the master and follow-up counters receive $f_c/2$ pulses, with the phase of the follow-up counter 46 output square wave being fixed while the phase of the clipper 44 output square is attitude sensitive by virtue of the action of the phase shifter 38. Note should be made that though the master counter 34 and the follow-up counter 46 may be identical, they need not necessarily be in synchronism with each other, even though both receive the same signal $f_c/2$, since it is the follow-up counter 46 and clipper 44 whose output signals are phase compared.

The output signal from the clipper circuit 44 is applied to a trigger flip-flop circuit ff–1 arranged to switch states in response to square wave trailing edges. Similarly, the square wave output of the follow-up counter 46 is applied to a trigger flip-flop circuit ff–2, also arranged to switch states in response to square wave trailing edges. An AND circuit 48, sensitive to "low" D.C. levels rather than trailing edges, senses that both flip-flops have been set by monitoring the clipper and follow-up counter D.C. levels. Upon sensing coincident low D.C. conditions the AND circuit resets ff–1 and ff–2 so that they are ready for the next cycle. If the flip-flops are not being triggered simultaneously, the clipper and follow-up counter are not in synchronization.

To bring (for synchronizing purposes) the phases of the signals from the follow-up counter 46 and the clipper 44 together, a logic network is provided which either applies pulses to the follow-up counter 46 at a higher rate ($f_c$) than those ($f_c/2$) applied to the master counter 34, or no pulses to the follow-up counter 46 depending respectively on whether the clipper output has a phase lead or a phase lag over the follow-up counter. Meanwhile the master counter 34 runs at a steady rate receiving $f_c/2$ pulses. The logic circuit consists of three AND gates (50, 52, 54) and an OR (56) gate, the output of which feeds the follow-up counter 46 with its pulse input.

As the operation of the apparatus of FIG. 2 in the synchronize mode, consider that there is a pick-off signal $\phi_e$, and that the phase of the clipper signal leads the follow-up counter 46 output signal. On appearance of the first square wave trailing edge signal at the flip-flop circuit *ff–1* input, it flips to a ONE state to apply a gate opening signal (INC.) to the AND circuit 50, whereby the high frequency signal $f_c$ gets applied through the OR circuit 56 (a SYNC or NOT-CLAMP signal being also applied to AND gate 50) to speed up the follow-up counter 46 and brings its output into phase with the clipper 44 output. During the time both flip-flops are reset by simultaneous application of low D.C. levels to the AND circuit 48, AND gate 54 enables and applies $f_c/2$ pulses per second to drive the follow-up counter at the same rate as the master counter. Eventually, both the follow-up counter 46 and the clipper 44 provide simultaneously occurring square wave trailing edge signals, with both the master counter 34 and the follow-up counter continuously receiving pulses at the same frequency $f_c/2$, the identical phase relationship between the follow-up counter output signals and the clipper signals being maintained, the condition necessary for synchronization is achieved.

Consider what happens in the synchronize mode when for example the phase of the clipper 44 output signal lags the follow-up counter signal. Now the flip-flop circuit *ff–2* goes to its ONE state first, whereby no pulses get applied through the OR circuit 56 to the follow-up counter 46. Since the master counter 34 continues to receive pulses at the frequency $f_c/2$, its signal phase catches up with respect to the signal phase of the delayed follow-up counter, whereby so does the phase of the clipper 44 output signal. On phase coincidence of the follow-up counter 46 signal and the clipper 44 signal, synchronization is manifested as previously described by the simultaneous resetting of both the flip-flop circuits *ff–1* and *ff–2* at the instant they are to be set.

For the attitude-hold mode, a switch 58 is moved to its CLAMP position, whereupon the AND gate 52 is assured of an output signal frequency $f_c/2$ (AND gate 50 is disabled, and although AND gate 54 is either blocking pulses or passing pulses at a rate of $f_c/2$, any pulses which are passed are merely superimposed on the pulses from the AND gate 52 at the OR gate 56, resulting in a continuous pulse rate output, $f_c/2$, at the OR gate 56). Now, variations in the phase of the clipper 44 output signals in response to the attitude changes (i.e. $\phi_e$ goes to $\phi'_e$) with respect to the attitude had at the instant the switch 58 was actuated will provide non-synchronized operation of the flip-flop circuits *ff–1* and *ff–2*, from which pulse width information may be derived for automatic cancellation of such attitude changes in a manner to be described presently.

Connected to receive the signals of the flip-flop circuits *ff–1* and *ff–2* when such circuits are in their respective ONE states (low level output) are a pair of transistor switches 60 and 62, which switches act like inverters with precise logic levels for computing purposes. The switches 60 and 62 each have their respective outputs applied to integrating filter circuits 64 and 66, and signals appearing at the outputs of those filter circuits are applied respectively to the "adding" and "subtracting" leads of a differential amplifier 72 which computes the difference between the levels of its two input signals, both of which can only be positive or zero.

With the flip-flops *ff–1* and *ff–2* in their ZERO (or high level output) states while synchronized (switch 58 at "CLAMP"), the inverting switches 60 and 62 remain off and apply low level (or zero) inputs to the differential amplifier 72, which in turn provides a zero output.

Now, when disturbances cause the craft attitude to change from $\phi_e$ to $\phi'_e$ to make for example the clipper output phase lead the fixed phase follow-up counter output (see FIG. 3), the flip-flop *ff–1* will switch its states first, after which time the AND gate 48 will cause the flip-flop *ff–1* to reset to ZERO, (because both the clipper 44 and follow-up counter 46 produce simultaneously occurring low D.C. signal levels ($t_1$ to $t_2$) thereby producing a pulse of a given width. The flip-flop *ff–2* doesn't switch at time $t_1$ because the AND circuit 48 output overrides it. At $t_3$, the flip-flop *ff–1* again switches to its ONE state because of application of a clipper output trailing edge combined with absence of an AND circuit 48 output (i.e. both the clipper 44 and follow-up counter 46 outputs are high D.C. signal levels, and not the necessary low ones). The above is repeated over and over, resulting in a chain of positive pulses each of a given width or duration being applied by the switch 60 (and nothing being produced by the switch 62) to its filter 64. The filter 64 then operates to apply a positive signal level to the "adding" lead of the differential amplifier 72, which in turn applies a positive D.C. level to the craft autopilot for attitude corrective action.

Were the craft attitude to have changed from an attitude $\phi_e$ to an attitude $\phi''_e$ so that the clipper output signal phase lags the phase of the follow-up counter output signal, then the filter 66 would have applied a positive signal level of a particular amount to the "subtracting" lead of the differential amplifier 72 (this being because the flip-flop *ff–2* this time would have been the first to switch states), whereupon the differential amplifier 72 would have applied a negative D.C. signal level for corrective application to the craft autopilot.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. Apparatus for use in producing a signal useful in a control system comprising reference means for establishing an attitude reference, pick-off means coupled to said reference means for producing a signal of a particular frequency having a phase representative of an instantaneous attitude with respect to said reference attitude, signal producing means for producing a signal having said particular frequency, means for comparing the phases of two signals to produce an output signal representing the difference in such phases, means for shifting the phase of the signal produced by said signal producing means in proportion to said output signal, said means for comparing the phases of two signals being arranged to receive the output signals from said pick-off means and said signal phase shifting means, and selective means for making the phase of the output signal from said phase shifting means invariant, whereby said phase comparing means then provides a control signal representing instantaneous attitude with respect to the attitude had at the instant said selective means was actuated.

2. Apparatus for use in producing a signal useful in a control system for controlling a given condition comprising reference means for establishing a reference condition, first excitation means, pick-off means coupled to said reference means and excited by said first excitation means for varying the phase of the signal from said first excitation means in proportion to the magnitude of said given condition taken with respect to the reference condition, second excitation means for producing a signal the frequency of which is the same as the frequency of the signal from said first excitation means, means for comparing the phases of two signals to produce an output signal representing the difference in such phases, means for shifting the phase of the signal produced by said second excitation means relative to the phase of the signal produced by said first excitation means in proportion to said output signal, said means for comparing the phases of two signals being adapted to receive the output signals from said pick-off means and said means for shifting the phase of the signal from said second excitation means, and means cooperating with said phase shifting means for fixing the phase of the output signal from said second excitation means, whereby output signals from said phase comparing means become representative of respective conditions taken with respect to the condition had at the instant the phase of a second excitation means output signal was fixed.

3. The apparatus of claim 2 wherein said first excitation means comprises a clock pulse source, a first counter adapted to receive said clock pulses, first bistable means coupled to said first counter and arranged to have its states switched each time said counter becomes full to produce a first excitation signal, said pick-off means being excited by said switching bistable means, wherein said second excitation means comprises a second counter like said first counter and arranged to receive said clock pulses, second bistable means coupled to said second counter and arranged to have its states switched each time said second counter becomes full to produce a second excitation signal, and wherein said means for shifting the phase of the signal produced by said second excitation means provides more or less pulses to said second counter than to said first counter depending on whether said phase comparing means produces an output signal indicative of a phase relationship between the varied phase of said first signal and the phase of said second signal that has the phase of said second signal respectively behind and ahead of the phase of said first signal.

4. The apparatus of claim 2 wherein said first excitation means comprises a clock pulse source, a first counter adapted to receive said clock pulse, first bistable means coupled to said first counter and arranged to have its state switched each time said counter becomes full to produce a first excitation signal, said pick-off means being excited by said switching bistable means, wherein said second excitation means comprises a second counter like said first counter, second bistable means coupled to said second counter and arranged to have its states switched each time said second counter becomes full to produce a second excitation signal, wherein said apparatus includes pulse producing means for providing pulses at a rate higher than the pulse rate of said clock source, and wherein said means for shifting the phase of the signal produced by said second excitation means comprises means responsive to the output signal from said phase comparing means for selectively removing all pulses from being applied to said second counter, for applying pulses from said clock source to said second counter, or for applying pulses to said second counter from said pulse producing means depending on whether said output signal is respectively indicative of a phase relationship between the varied phase of said first signal and the phase of said second signal that has the phase of said second signal respectively ahead of, the same as, and behind phase of said first signal.

5. The apparatus of claim 3 wherein said means for fixing the phase of the output signal from said second excitation means includes means for applying only said clock pulses continually to said second counter.

6. The apparatus of claim 4 wherein said means for fixing the phase of the output signal from said second excitation means includes means for applying only said clock pulses continually to said second counter.

7. Apparatus for use in controlling the attitude of an aircraft comprising an autopilot reference means for establishing an attitude reference for said aircraft, pick-off means coupled to said reference means for producing a signal of a particular frequency having a phase representative of an instantaneous craft attitude with respect to said reference attitude, signal producing means for producing a signal having said particular frequency, means for comparing the phases of two signals to produce an output signal representing the difference in such phases, means for shifting the phase of the signal produced by said signal producing means in proportion to said output signal, said means for comparing the phases of two signals being arranged to receive the output signals from said pick-off means and said signal phase shifting means, selective means for making the phase of the output signal from said phase shifting means invariant, whereby said phase comparing means then provides a control signal representing instantaneous craft attitude with respect to the craft attitude had at the instant said selective means was actuated, and means for use in applying continuously said control signal to said autopilot.

8. Apparatus for use in controlling a particular condition comprising servo means, reference means for establishing a reference condition, first excitation means, pick-off means coupled to said reference means and excited by said first excitation means for varying the phase of the signal from said first excitation means in proportion to the magnitude of said given condition taken with respect to the reference condition, second excitation means for producing a signal the frequency of which is the same as the frequency of the signal from said first excitation means, means for comparing the phases of two signals to produce an output signal representing the difference in such phases, means for shifting the phase of the signal produced by said second excitation means relative to the phase of the signal produced by said first excitation means in proportion to said output signal, said means for comparing the phases of two signals being adapted to receive the output signals from said pick-off means and said means for shifting the phase of the signal from said second excitation means, and means cooperating with said phase shifting means for fixing the phase of the output signal from said second excitation means, whereby output signals from said phase comparing means become representative of respective conditions taken with respect to the condition had at the instant the phase of a second excitation means output signal was fixed, and means for use in applying the output signals from said phase comparing means continuously to said servo means.

9. The apparatus of claim 8 wherein said first excitation means comprises a clock pulse source, a first counter adapted to receive said clock pulses, first bistable means coupled to said first counter and arranged to have its states switched each time said counter becomes full to produce a first excitation signal, said pick-off means being excited by said switching bistable means, wherein said second excitation means comprises a second counter like said first counter and arranged to receive said clock pulses, second bistable means coupled to said second counter and arranged to have its states switched each time said second counter becomes full to produce a second excitation signal, and wherein said means for shifting the phase of the signal produced by said second excitation means provides more or less pulses to said second counter than to said first counter depending on whether said phase comparing means produces an output signal indicative of a phase relationship between the varied phase of said first signal and the phase of said second signal that has the phase of said second signal respectively behind and ahead of the phase of said first signal.

10. The apparatus of claim 8 wherein said first excitation means comprises a clock pulse source, a first counter adapted to receive said clock pulses, first bistable means coupled to said first counter and arranged to have its states switched each time said counter becomes full to produce a first excitation signal, said pick-off means being excited by said switching bistable means, wherein said second excitation means comprises a second counter like said first counter, second bistable means coupled to said second counter and arranged to have its states switched each time said second counter becomes full to produce a second excitation signal, wherein said apparatus includes pulse producing means for providing pulses at a rate higher than the pulse rate of said clock source, and wherein said means for shifting the phase of the signal produced by said second excitation means comprises means responsive to the output signal from said phase comparing means for selectively removing all pulses from being applied to said second counter, for applying pulses from said clock source to said second counter, or for applying pulses to said second counter from said pulse producing means depending on whether said output signal is respectively indicative of a phase relationship between the varied phase of said first signal and the phase of said second signal that has the phase of said second signal respectively ahead of, the same as, and behind phase of said first signal.

11. The apparatus of claim 9 wherein said means for fixing the phase of the output signal from said second excitation means includes means for applying only said clock pulses continually to said second counter.

12. The apparatus of claim 10 wherein said means for fixing the phase of the output signal from said second excitation means includes means for applying only said clock pulses continually to said second counter.

13. Apparatus for use in producing a signal useful in a control system comprising reference means for establishing an attitude reference, pick-off means coupled to said reference means for producing a signal of a particular frequency having a phase representative of an instantaneous attitude with respect to said reference attitude, signal producing means for producing a signal having said particular frequency, means for comparing the phases of two signals to produce an output signal representing the difference in such phases, means for shifting the phase of the signal produced by said signal producing means in proportion to said output signal, said means for comparing the phases of two signals being arranged to receive the output signals from said pick-off means and said signal phase shifting means, and selective means for making the phase of the output signal from said phase shifting means invariant, whereby said phase comparing means then provides a control signal representing instantaneous attitude with respect to the attitude had at the instant said selective means was actuated, said means for comparing two signals including first and second flip flop circuits arranged to receive respectively the output signals from said pick-off means and said signal phase shifting means and selectively switch states in response to identical phase conditions of their respective received signals, means for producing pulses having variable widths proportional to the time difference between the switching of said first and second flip flop circuits, and means responsive to said variable pulses of widths for producing a signal representative of said widths, said representative signal being said control signal.

14. Apparatus for use in controlling the attitude of an aircraft comprising an autopilot reference means for establishing an attitude reference for said aircraft, pick-off means coupled to said reference means for producing a signal of a particular frequency having a phase representative of a instantaneous craft attitude with respect to said reference attitude, signal producing means for producing a signal having said particular frequency, means for comparing the phases of two signals to produce an output signal representing the difference in such phases, means for shifting the phase of the signal produced by said signal producing means in proportion to said output signal, said means for comparing the phases of two signals being arranged to receive the output signals from said pick-off means and said signal phase shifting means, selective means for making the phase of the output signal from said phase shifting means invariant, whereby said phase comparing means then provides a control signal representing instantaneous craft attitude with respect to the craft attitude had at the instant said selective means was actuated, and means for use in applying continuously said control signal to said autopilot, said means for comparing two signals including first and second flip-flop circuits arranged to receive respectively the output signals from said pick-off means and said signal phase shifting means and selectively switch states in response to identical phase conditions of their respective received signals, means for producing pulses having variable widths proportional to the time difference between the switching of said first and second flip-flop circuits, and means responsive to said variable pulses of widths for producing a signal representative of said widths, said representative signal being said control signal.

References Cited
UNITED STATES PATENTS

| | | | |
|---|---|---|---|
| 3,079,548 | 2/1963 | Robinson | 318—28 XR |
| 3,310,721 | 3/1967 | Möller | 318—18 |

BENJAMIN DOBECK, *Primary Examiner.*